Figure 1:
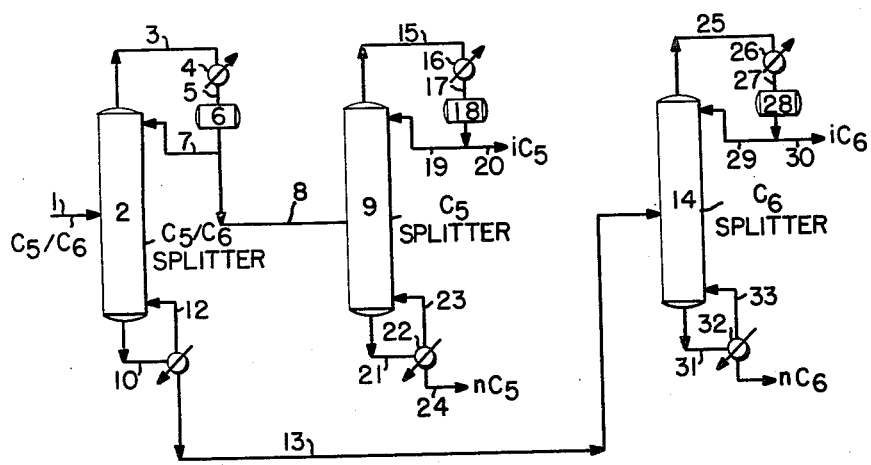

Oct. 16, 1962  R. P. CAHN ET AL  3,058,893
SEPARATION OF MULTICOMPONENT MIXTURE IN SINGLE TOWER
Filed Sept. 1, 1959  2 Sheets-Sheet 1

Robert P. Cahn
Alphonso G. DiMiceli  Inventors

By Peter H. Smolka

Patent Attorney

Robert P. Cahn
Alphonso G. DiMiceli    INVENTORS

BY Peter H. Gwulka

PATENT ATTORNEY 3,058,893
SEPARATION OF MULTICOMPONENT MIXTURE IN SINGLE TOWER
Robert P. Cahn, Elizabeth, and Alphonso G. Di Miceli, Union, N.J., assignors to Esso Research and Engineering Company, a corporation of Delaware
Filed Sept. 1, 1959, Ser. No. 837,490
7 Claims. (Cl. 202—40)

The present invention relates to a combination process for distilling two or more feed streams, each feed stream boiling entirely outside the range of the other feed streams, to obtain on each feed stream a separation of at least two "pure" (i.e. uncontaminated with material from the other feed stream(s) processed) fractions. More particularly, this invention relates to feeding each of said feed streams separately at spaced points down a single distillation column, each lower boiling stream being introduced above the higher boiling streams, and taking off from said single column two "pure" fractions of material for each feed stream supplied to the column. Yet more particularly in a preferred embodiment this invention relates to a system wherein the two feed streams are prepared by fractionating a wide cut fraction in an initial fractionation column having no condenser or reboiler equipment, the said feed streams being supplied directly to the main column and the liquid reflux and vapor reboil streams for the initial column being obtained as side streams from the main distillation column. Thus, in this embodiment, the load from the eliminated equipment is transferred onto the condenser and reboiler of the main column. In another preferred embodiment this invention relates to utilizing steam in the main distillation column to lower the bottoms temperature required in the column.

The present invention provides large improvements over prior art methods. Thus, over the prior art method for separately distilling two feed fractions in two towers to obtain four components, the overhead condenser and reflux system on one tower and the reboiler system on the other tower are entirely eliminated and the distillation is conducted in a single tower. Further, it should be noted that the steam and cooling water formerly required for this equipment dispensed with are also entirely eliminated. The present invention is extraordinary in that rather than merely transferring these heating and cooling loads to equipment connected with other distillation equipment (a technique well known in the art) they are eliminated. Thus, in effect these loads counterbalance each other and a heat exchange is obtained directly in the column.

That this invention is possible is remarkable and unexpected in that (1) according to the prior art it was accepted that a cardinal rule of distillation was that for each separation of $n$ pure components $n-1$ columns were required and (2) it was known that it was not possible to take off a side stream of a pure third component boiling between the overhead component and the bottoms component in the tower. Thus, with respect to the former of these for a separation of four components it was thought that three towers were necessary and with respect to the latter it was thought that in any single tower any side stream of a third (or fourth) component taken off between the overhead and bottoms streams would be contaminated with the overhead component if above the feed plate and would be contaminated with the bottoms component if taken off below the feed plate. It has now been discovered surprisingly that these two tenets of the distillation art do not preclude the present invention which obtains the separation of four components in only two rather than three towers.

The present invention will be more clearly understood from a consideration of a specific preferred process. For ease of understanding both the prior art system for carrying out this process and the present invention system will be described as well as economic evaluations comparing these systems.

Figure 2:
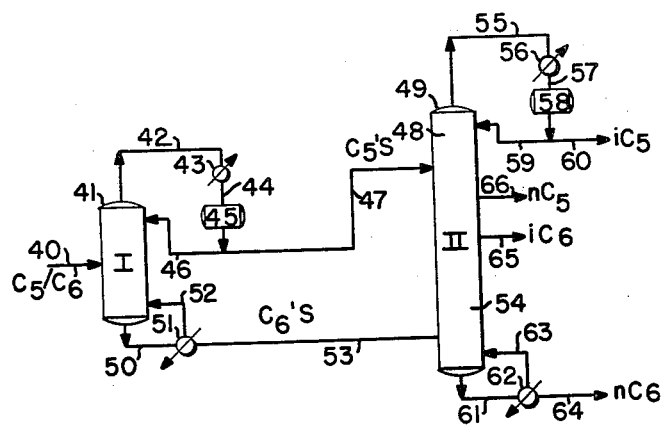
Figure 3:
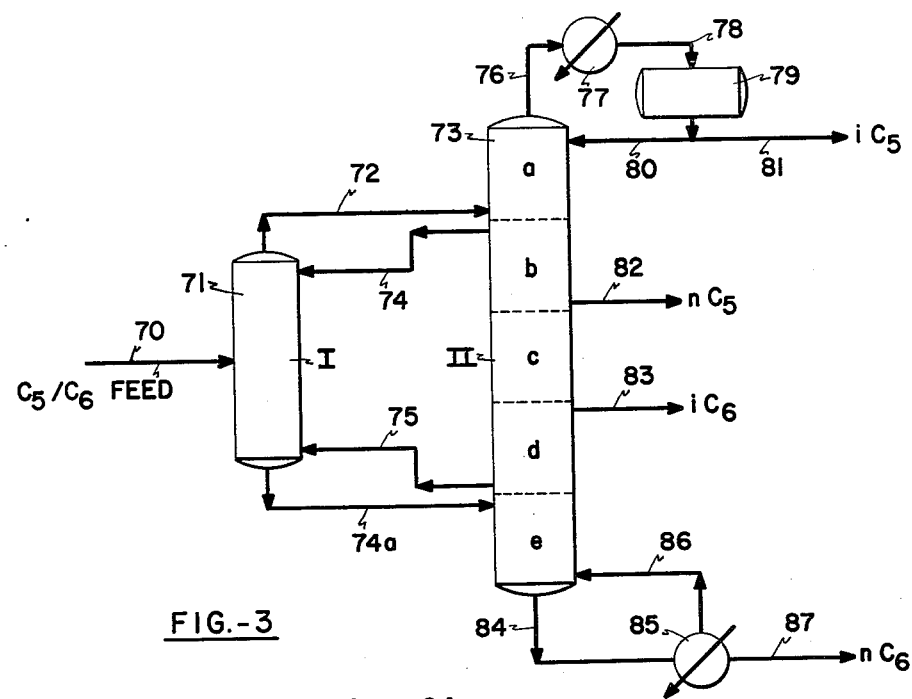

Turning now to the drawings, FIGURE 1 represents the prior art separate distillation of two feed streams system (including an initial column wherein said feed streams are prepared from a wide cut fraction); FIGURE 2, the basic improvement over said system, wherein the condenser and reflux system of one tower and the reboiler of the other tower are entirely eliminated and distillation is carried out in a single column; FIGURE 3, a further improvement wherein the reflux and reboil systems of the feed stream preparation column are eliminated (the load being shifted to the reflux and reboil systems of the main distillation column); and FIGURE 4, the preferred embodiment wherein an equalization of tower loadings between the two towers is obtained by shifting several sections of the main tower back to the feed preparation tower.

Turning now to FIGURE 1 describing the prior art system, a $C_5/C_6$ feed is supplied through line 1 to splitter tower 2 where a $C_5$ stream is taken overhead through line 3, is condensed in condenser 4 and is passed through line 5 to reflux drum 6. From this drum a part of the material is returned to the column through line 7 and the remainder is passed through line 8 to $C_5$ splitter tower 9. From the bottom of the $C_5/C_6$ column a stream is passed through line 10 to reboiler 11 wherein a part of the stream is reutrned to the column through line 12 and the remainder is passed through line 13 to $C_6$ splitter tower 14. Returning now to the $C_5$ splitter tower 9 an overhead stream of isopentanes is passed through line 15 to cooler 16 and through line 17 to reflux drum 18. From this drum a part of the stream is returned to the column through line 19 and the remainder is passed from the system as product through line 20. From the bottom of the $C_5$ splitter normal pentanes are passed through line 21 to reboiler 22 where a part of the materials is vaporized and returned through line 23 to the column and the remainder is passed as product from the stystem through line 24. Returning now to the $C_6$ splitter tower 14 isohexanes are passed overhead through line 25 to condenser 26 through line 27 to reflux drum 28. From said drum a part of the stream is returned to the column through line 29 and the remainder is passed from the system as product through line 30. From the bottom of the column the normal hexanes are passed through line 31 to reboiler 32 where a part of the stream is returned to the column through line 33 and the remainder is passed from the system as product through line 34. As can be seen in this system two separate towers each with attendant reboiler and reflux equipment are required to separate the $C_5$ and $C_6$ cuts into their iso and normal isomer fractions, respectively.

Turning to FIGURE 2, the simplest embodiment of the present invention improved system is described. Here, the $C_5/C_6$ stream is supplied through line 40 to a first tower, I, 41 where $C_5$'s are again separated overhead and are passed through line 42 to condenser 43 and through line 44 to reflux drum 45. From this drum part of the stream is again returned to the column through line 46 and the remainder of the stream is passed through line 47 to the upper part 48 of a second tower II, 49. From the bottom of column 41 the bottom $C_6$ stream is passed through line 50 to reboiler 51 where a part of the stream is returned to the column through line 52 and the remainder is passed through line 53 to the lower part 54 of column 49. In the upper part 48 of column 49 the isopentanes are taken overhead through line 55 and are passed through condenser 56 and line 57 to reflux drum 58. From this drum a part of the isopentanes are recycled to the column through line 59 and the remainder are taken from the system as product through line 60. From the bottom section 54 of the column normal hexanes are passed downward and out through line 61 to reboiler 62 where part of the stream is vaporized and returned to the column through line 63 and the remainder is taken from the system as product through line 64. With respect to the normal pentanes and isohexanes these materials are separated in an exchange middle section of the tower. Thus this section is in actuality just a "total reflux section" to interchange the isohexanes rising from the lower part 54 of the column with the normal pentanes descending from the upper part of the tower 48. Thus the normal pentanes descending in this section are boiled overhead from the isohexanes and likewise the isohexanes rising in the middle section are condensed from the normal pentanes and are returned to be taken off as a side stream through line 65. Likewise, with reference to the normal pentanes these materials are taken off in a pure state through line 66. It should be noted that by the process of the present invention over the conventional system savings of the reboiler system on the $C_5$ splitter tower and the reflux system on the $C_6$ splitter tower are obtained.

A further improvement over the system described in FIGURE 2 is obtained by eliminating the condenser and reboiler of the first tower I and throwing the corresponding load onto the condenser and reboiler of the second tower II as is described in FIGURE 3. Thus again a $C_5/C_6$ feed is supplied through line 70 to a first tower I, 71. The vapor overhead $C_5$ stream is passed through line 72 directly to the lower part of section $a$ of a second tower II, 73, and essentially at the same point as the entry of this stream a liquid stream of material is returned through line 74 to tower 71. Likewise, from the bottom of tower 71 the liquid $C_6$ stream is passed via line 74a to the upper part of section $e$ of tower 73 and at about the same point in column 73 a vapor stream is taken off and is passed through line 75 back to the bottom of tower 71. In tower 73 overhead, bottoms and side streams are as described in connection with tower II of FIGURE 2. Thus isopentanes are passed through line 76, to condenser 77 through line 78 to reflux drum 79. A reflux stream is returned through line 80 and product isopentanes are passed from the system through line 81. A side stream of normal pentanes is taken from the bottom of section $b$ through line 82. From the upper part of section $d$ directly below the exchange section $c$, a side stream of isohexanes is passed from the system through line 83 and from the bottom of the column normal hexanes are passed through line 84 to reboiler 85 where part of this stream is vaporized and returned to the column through line 86 and the remainder is passed from the system through line 87. It can be seen that this improvement over FIGURE 2 obtains a reduction in the number of exchangers, drums, etc. but does not reduce the load over that of FIGURE 2. Further, of course, to some extent sections $a$ and $e$ of tower 73 have to be increased somewhat in size to accommodate the extra vapor and liquid loads. On balance, however, there is a saving in equipment over that of FIGURE 2.

Figure 4:
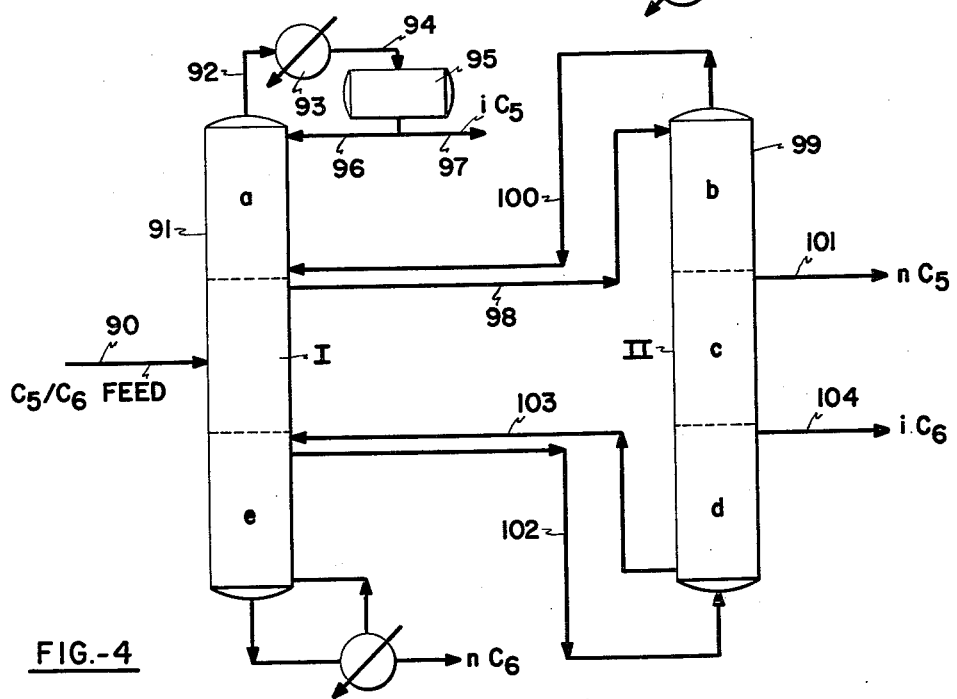

As a final improvement the system described in FIGURE 4 presents a design wherein to equalize tower loads, sections $a$ and $e$ of the tower II described in FIGURE 3 are transferred to the first tower. Thus, in the diagram, this change of position of sections can be easily followed in that sections $a$, $b$, $c$, $d$ and $e$ in this figure are equivalent in function to the sections identified similarly in FIGURE 3. In this figure a $C_5/C_6$ feed is supplied through line 90 to column 91, isopentanes are taken overhead on the upper part of section $a$ and are passed through line 92, condenser 93 and line 94 to reflux drum 95. From this drum a reflux stream is returned through line 96 and the remainder of the isopentanes are taken as product from the system through line 97. From below section $a$ a liquid stream is passed through line 98 to the upper part of section $b$ of column 99 and overhead vapor from column 99 is returned to column 91 through line 100. From the upper part of exchange section $c$ of tower 99 normal pentanes are passed as a side stream through line 101 from the process. From the upper part of the bottom section $e$ of column 91 a vapor stream is passed through line 102 to the bottom of tower 99 where a liquid stream is taken from the bottom section $d$ of said column and is passed through line 103 to the upper part of section $e$ of column 91. Likewise, normal hexane product is passed through line 104 from the system. In this embodiment of the present invention tower loadings are equalized and an extremely efficient preferred system is obtained. It should be noted that in all the present invention systems described in FIGURES 2 through 4 obviously towers such as tower II may be replaced by two towers as is conventional in the art to avoid structural problems that are encountered with overly tall columns.

The following calculations describing the processing of 2,810 b./s.d. (in all cases at 40 p.s.i.g. pressure) illustrates the improvements of the present invention. The feed and product splits are as follows (in all cases).

| Comp. | Total Feed, b./s.d. | iC$_5$ Cut, b./s.d. | nC$_5$ Cut, b./s.d. | iC$_6$ Cut, b./s.d. | nC$_6$ Cut, b./s.d. |
|---|---|---|---|---|---|
| iC$_5$ | 458 | 439 | 18 | 1 | |
| nC$_5$ | 970 | 41 | 870 | 59 | |
| iC$_6$ | 607 | | 2 | 517 | 88 |
| nC$_6$ | 775 | | | 13 | 762 |
| | 2,810 | 480 | 890 | 590 | 850 |

The number of plates in the towers and the reflux in the conventional system in FIGURE 1, and the improved systems, FIGURES 2, 3 and 4 are presented below.

*Prior Art*

| Conventional Tower | Actual Plates | Reflux, b./s.d. |
|---|---|---|
| C$_5$/C$_6$ Splitter | 42 | 4,520 |
| C$_5$ Splitter | 68 | 3,600 |
| C$_6$ Splitter | 69 | 4,250 |

*Present Invention*

| Tower | Actual Plates | | | Reflux, b./s.d. | | |
|---|---|---|---|---|---|---|
| | Fig. 2 | Fig. 3 | Fig. 4 | Fig. 2 | Fig. 3 | Fig. 4 |
| I | 42 | 42 | 79 | 4,520 | 4,520 | 9,750 |
| II | 155 | 137 | 100 | 4,250 | 9,750 | 5,210 |
| or | | | | | | |
| a | 32 | 22 | 22 | | | |
| b | 32 | 32 | 32 | | | |
| c | 22 | 22 | 22 | | | |
| d | 46 | 46 | 46 | | | |
| e | 23 | 15 | 15 | | | |

A comparison of the investments and utility consumptions between the conventional system (FIG. 1) and the preferred present invention system of FIGURE 4 is as follows:

*Onsite Investments and Utility Requirements*

| | Conventional | Present Invention, Fig. 4 |
|---|---|---|
| Onsite Investment, $M | 600 | 480 |
| Utility Requirements: | | |
| Steam, lb./hr. @ 125 p.s.i.g | 25,600 | 20,300 |
| Power, kw | 100 | 100 |
| Cooling water, g.p.m | 1,500 | 1,230 |

As can be seen very substantial savings of about 20% are obtained in equipment costs and of approximately 20% in utilities consumption are obtained.

It is not intended to limit the present invention to the processing of only two feed streams since obviously three or more feed streams each boiling outside the range of the other feed streams, may be processed to obtain six or more "pure" fractions, i.e. at least two for each feed stream supplied to the column. Thus, the feed streams would be supplied in the order (from low to high) of their boiling points to separate sections down the column and from each of said sections of the column at least two "pure" fractions would be taken off. Thus, in the three feed stream embodiment two reboiler and reflux systems are eliminated for one reboiler and reflux system required, which is proportionally a greater saving than is obtained where only two feed streams are fractionated. It should be noted as mentioned above that obviously a separation of three or more cuts rather than two cuts from a particular feed stream may be conducted if desired in the combination distillations of this invention.

In another embodiment, two feed streams which have a component in common can be handled in the manner shown. Thus, if one feed is a mixture of $A+B$, and another a mixture of $B+C$, then by feeding them separately to a tower smiliar to column II in FIGURE 2, three pure streams A, B and C, respectively, can be taken off as products. Exchange section $c$ in column II can be eliminated since fractionation between components B of $A+B$, and B of $B+C$ is redundant. A similar procedure can be used if it is desired to simultaneously distill two mixtures, say $A+B$, and $C+D$, respectively, and the heavier boiling component of one mixture, say B, and the lighter boiling component of the other, say C, can be mixed. In that case products A, $B+C$, and D can be taken off, again eliminating exchange section $c$ as unnecessary.

In another preferred embodiment steam may be used where streams boiling within a wide boiling range are processed. Thus, of course, since the tower is operated at a single pressure, to obtain the condensation and removal of the lighter fractions as overhead or side streams in the upper part of the column a considerable pressure is required. Yet at that pressure extremely high temperatures are required to obtain fractionation of the higher boiling fractions. This problem is greatly alleviated in the processing of streams boiling in a wide boiling range by adding steam which lowers the distillation temperature required for the higher boiling materials. Thus at a particular pressure the steam lowers the temperature required to vaporize the high boiling fraction in the lower part of the column yet does not appreciably decrease the temperature required for condensation of the low boiling fractions in the upper section of the tower.

A typical combination distillation of two streams boiling within a wide boiling range is that where distillations are obtaned on a $C_3/C_4$ stream and on a second stream boiling in the range of 150–400° F. Such streams are available from many processes, such as crude distillation, catalytic and thermal cracking, or catalytic reforming, and require processing to separate the $C_3$ from the $C_4$ components for sale as L.P.G., polymerization, alkylation, cracking or petrochemical conversion feed stocks and of a 150–250° F. cut for the production of light naphtha from a 250–400° F. cut for utilization as heavy naphtha. According to this process for example, 6000 b./s.d. of the $C_3/C_4$ cut containing 3000 b./s.d. $C_3$ and 3000 b./s.d. $C_4$ and 4000 b./s.d. of the 150–400° F. cut containing 1500 b./s.d. of a 150–250° F. material and 2500 b./s.d. of 250–400° F. material are processed in a tower II as described in FIGURE 2. 8,500 lb./hr. of steam at a pressure of 20 atm. is supplied at a point near the bottom of the column and liquid water is removed as a separate phase from the bottom of the column but only in trace amounts in the overhead separator. Reflux of 10,000 b./s.d. is maintained and an efficient separation of all the desired "pure" components is obtained.

If the reflux requirements for the separations in the upper and lower sections of tower II are quite different, it is possible to install intermediate pump-around coolers or heaters along the length of column II. Thus, a pump-around cooler can be installed anywhere in or near exchange section $c$ if the reflux requirements of the lower separation exceed those of the upper separation by an appreciable amount. Conversely, a pump-around heater can be used when the upper section requires more reflux than the lower.

It can also be seen that several towers can be tied in together by the scheme just indicated. For example, in the example just described with $C_3/C_4$ and 150–400° F. cut feeds, two or more separate depropanizers can be tied into the 150–400 separation, by splitting the overhead stream from the 150–400 separation to two or more exchange sections and two or more corresponding $C_3/C_4$ splitters. Thus, for example, one of the sections driven by the overhead from the 150–400° F. section may be a $C_3/C_4$ splitter handling catalytic cracking light ends and the other section may be an alkylation plant light ends $iC_4/nC_4$ splitter.

Obviously it is contemplated according to this invention that any combination distillation on two or more feed streams each boiling outside the range of the other streams can be conducted and that the large benefits above described will result therein. Thus, it is expected that this invention will have application to the processing of gross refinery streams, to the processing of special streams to produce pure petrochemicals, and to superfractionations involving either of these.

The foregoing description contains a limited number of embodiments of the present invention. It will be understood that this invention is not limited thereto since numerous variations are possible without departing from the scope of the following claims.

What is claimed is:

1. An improved combination distillation process which comprises distilling in a first distillation column a feed stream to separate a vaporized overhead stream and a liquid bottom stream, said vaporized overhead stream boiling outside the range of the liquid bottom stream, supplying said vaporized overhead stream and the liquid bottom stream directly to an upper and a lower section respectively of a second distillation column, carrying out a distillation in said second column, withdrawing a liquid side stream from a point adjacent the point at which the said vaporized overhead stream is introduced and reutrning said side stream to said first distillation column as reflux for said column, withdrawing a vapor side stream adjacent the point of introduction of said liquid bottom stream into said second column and introducing said vapor side stream into said first distillation column as reboil for said column, and withdrawing from the said upper section and from the said lower section of the second distillation column respectively two pure fractions from each stream supplied to each of said sections uncontaminated with materials from the feed stream.

2. The process of claim 1 in which said feed streams boil at least 100° F. apart.

3. The process of claim 2 in which said distillation is carried out in the presence of steam.

4. The process of claim 1 in which the feed streams supplied to the column are a $C_5$ boiling fraction, a $C_6$ boiling fraction, and a $C_7$ boiling fraction.

5. The process of claim 1 in which the feed streams supplied to the column are a $C_4$ boiling fraction and a $C_5$ boiling fraction.

6. An improved process for separating isopentanes from normal pentane in a $C_5$ cut and isohexanes from normal in a $C_6$ cut, the said $C_5$ and $C_6$ cuts each boiling entirely outside the other's boiling range, which comprises preparing said $C_5$ cut and said $C_6$ cut in an initial distillation column, separately passing the overhead stream and the bottoms stream from said initial distillation column to a multiple feed stream distillation column, said $C_5$ cut being supplied above the $C_6$ cut, withdrawing a liquid side stream from a point adjacent to the point at which the vaporized overhead stream is introduced and returning said side stream to said initial distillation column as reflux for said column, withdrawing a vapor side stream adjacent to the point of introduction of said liquid bottom stream into said second column and introducing said vapor stream into said initial distillation column as reboil for said column, withdrawing substantially pure normal pentane and substantially pure isohexanes as separate streams from the section of the multiple distillation column intermediate said feed streams, and separating substantially pure normal hexane as bottoms from said multiple distillation column.

7. The process of claim 6 in which tower loadings and plate distribution are equalized by locating the isopentane stripping section of the multiple feed stream distillation column above and connected to the main section of the initial distillation column, and the normal hexane enriching section of the multiple feed stream distillation column below and connected to the main section of the initial distillation column.

References Cited in the file of this patent

UNITED STATES PATENTS

| | | |
|---|---|---|
| 1,722,322 | Barbet | July 30, 1929 |
| 1,820,573 | Lyons | Aug. 31, 1931 |
| 2,909,582 | Bleich et al. | Oct. 20, 1959 |

FOREIGN PATENTS

| | | |
|---|---|---|
| 526,174 | Great Britain | Sept. 12, 1940 |